Dec. 31, 1968 MINORU TODA 3,419,737

HALL EFFECT INDUCTIVE ELEMENT

Filed May 23, 1966

INVENTOR.
MINORU TODA
BY
W. S. Hill
AGENT 3,419,737
HALL EFFECT INDUCTIVE ELEMENT
Minoru Toda, Princeton, N.J., assignor to Radio Corporation of America, a corporation of Delaware
Filed May 23, 1966, Ser. No. 552,291
6 Claims. (Cl. 307—309)

ABSTRACT OF THE DISCLOSURE

A Hall effect inductance device comprising a body of high mobility semiconducting material, two current supply terminals connected to the body defining a current axis, at least one pair of Hall electrodes connected to the body and defining a voltage axis at right angles to the current axis, and an impedance which is capacitive only, connected across each pair of Hall electrodes.

---

This invention relates to a novel and improved solid state inductance element and, more particularly, to an inductance that is suitable for use in some types of microcircuits.

In the designing of semiconductor monolithic integrated circuits, the use of inductive elements has generally been avoided since no inductive element satisfactory for such use has been available. Many different types of miniaturized inductive elements intended for use in monolithic type circuits have been proposed. These have included evaporated coils and P-N junction units utilizing the lag of the diffusion or drift of charge carriers injected through the junction. None of these proposed types has been adopted to any extent in commercial micro-miniature circuits. Some of the reasons for the lack of acceptance have been manufacturing difficulties, in the case of the evaporated coil, and inability to obtain sufficiently high values of inductance, in the case of the junction type device.

One object of the present invention is to provide an improved inductance element suitable for use in monolithic type micro-miniature circuits.

Another object of the invention is to provide a solid state inductive circuit element capable of exhibiting a wide range of inductance values.

Briefly, the device comprises a bar or plate of semiconductor material, such as N-type indium antimonide with a single carrier, having a high carrier mobility, two current-supply terminals connected to the semiconductor body and defining a current axis, and at least one pair of Hall electrodes connected to the semiconductor body between the current-supply terminals defining a Hall voltage axis at right angles to the current axis. A capacitor is connected across each pair of Hall electrodes. The device also includes means providing a magnetic field having a component normal both to the current axis and to the Hall voltage axis, and, preferably, unless very high mobility materials are available, means for maintaining the plate at a low temperature.

Figure 1:
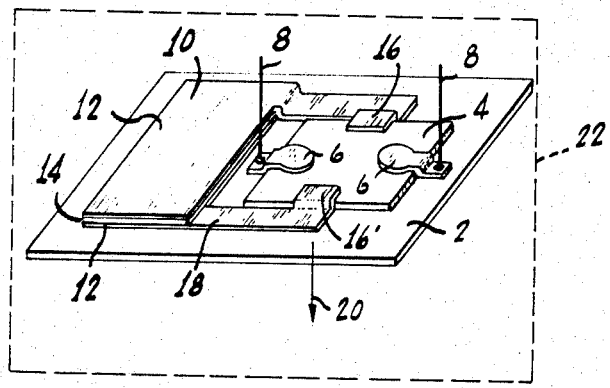
FIGURE 1 is a perspective view, partially schematic, of one embodiment of a device constructed in accordance with the present invention.

A typical device of the present invention may, as illustrated in FIGURE 1, include a suitable insulating substrate platform 2, which may, for example, be composed of ceramic or glass, carrying a thin, preferably but not necessarily, rectangular plate 4, of a high mobility semiconductor such as indium antimonide. A pair of current-supply terminals 6, of soldered indium, make ohmic contact to opposite ends of semiconductor plate 4. These terminals may overlap part of the substrate 2. Lead wires 8 are attached to the terminals 6. The terminals define a current axis through the plate 4 which is parallel to the upper surface of the plate 4.

The device also includes a thin film capacitor 10 which is supported on the insulating substrate 2. The capacitor comprises metal films 12 separated by a dielectric film 14.

Two Hall electrodes 16 and 16' are ohmically connected to the plate 4 between the current-supply terminals 6 and define a Hall voltage axis through the plate 4 at right angles to the current axis. The plates 12 of the capacitor 10 are connected to the Hall electrodes 16 and 16' through metal strip leads 18 which are supported on the substrate 2.

Means (not shown) are also included for applying a magnetic field in the direction indicated by the arrow 20. Means may also be included, as indicated at 22, for maintaining a low temperature. This may be a conventional cryogenic device.

When the device is used in a circuit, the terminals 6 can be connected in any way that the terminals of a conventional inductance can be connected.

Different values of inductance can be obtained by varying the magnetic field. Inductance increases as the magnetic field increases.

The inductance can also be varied by changing the capacitance value of the capacitor 10. As the capacitance is increased, the inductance increases.

Another factor which can be adjusted to obtain different values of inductance is the dimension (thickness) of the semiconductor plate in the magnetic field direction. As this dimension decreases, inductance increases.

With presently available semiconductor materials, it is preferred to maintain the device at a low temperature in order to improve charge carrier mobility and to suppress thermally generated holes. When materials of greater perfection and purity are available, it will not be necessary to cool to low temperatures.

Experimental units have been made to test the properties of devices in accordance with the invention.

One of these units was made using N-type indium antimonide for the semiconductor. The indium antimonide had an impurity concentration of about $9 \times 10^{13}/cm.^3$ and was in the form of a monocrystalline plate 0.1 mm. thick, 2 mm. wide and 9 mm. long.

Current-supply terminals of indium were alloyed to the ends of the plate so that the axis of current flow was along the longitudinal axis of the plate. Hall electrodes, also of indium, were affixed to the lateral edges of the plate and a capacitor was connected across the electrodes. Actually, instead of a single capacitor, five smaller capacitors (FIGURE 2) 10a to 10e, were connected to five pairs of Hall electrodes 16a to 16e through leads 18a to 18e, respectively. The size of each Hall contact should not be too large or too small. If the size is too large, the applied electric field may be shorted by the Hall contacts. On the other hand, if the contacts are too small, spreading resistance is large.

Figure 2:
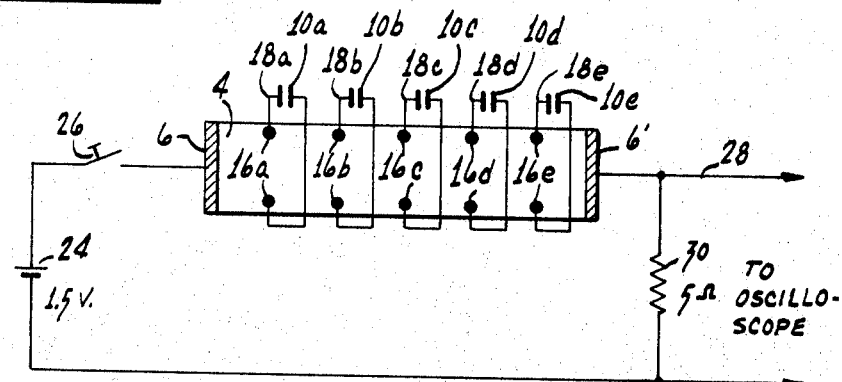
FIGURE 2 is a circuit used to test the effects of different variables on the inductance values of devices of the present invention.

A variable strength electro-magnet was arranged so that its poles were located a short distance above and below the plate. The entire unit was encased in an insulated housing that could be maintained at low, subnormal temperatures. Tests were run with the device connected in a circuit as shown in FIG. 2. One of the current-supply terminals 6 of the semiconductor plate 4 was connected to one terminal of a battery 24 through a switch 26. The other current supply terminal 6 of the semiconductor plate 4 was connected to one of the input leads 28 of an oscilloscope (not shown). Another input lead 28' of the oscilloscope was connected to the other terminal of the battery. A load resistor 30 was connected across leads 28 and 28' to facilitate current readings.

Each of several different values of capacitance was selected for the capacitors 10a to 10e. A series of readings was taken by varying the applied magnetic field between about 1 and 10 kilogauss. The direction of the magnetic field was as indicated in FIGURE 1. The device was maintained at a temperature of 77° K.

Figure 3:
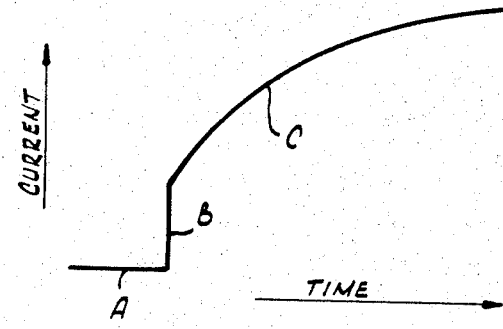
FIGURE 3 is an illustration of an oscilloscope trace obtained experimentally when testing devices of the invention.

A current curve tracing, as shown in FIGURE 3, was obtained on the oscilloscope screen. In this curve, the first segment A is the zero current level before the switch 26 is closed. The next segment B shows a quick rise of current just after the switch is closed, to a low level determined by the large magneto resistance of the Hall electrodes shorted by the capacitors 10a to 10e. The length of B can be decreased by increasing the number of Hall contacts.

The segment C of the oscilloscope tracing curve shows how the current slowly rises with time. A short time after the electric field is applied through the contacts 6, a Hall voltage is set up due to the capacitors 10a to 10e being charged by the large Hall current. The Hall electric field and the magnetic field cause a majority carrier flow in a direction perpendicular to both fields. The current due to the carrier flow has a certain value of time lag compared to that of the applied electric field. Thus, the device shows an inductive property.

With a capacitance of 0.05 $\mu$f. for the capacitor 10 and the magnetic field varied between 1 and 10 kilogauss, the unit exhibited an inductance of from about 0.3 to 15 millihenries. When the capacitance was set at 0.25 $\mu$f., the variation in magnetic field produced an inductance of from about 1.5 to about 80 millihenries. When the capacitance was 500 $\mu$f., the inductance was from about 6 to about 200 henries. And when the capacitance was 2500 $\mu$f., the inductance was from about 30 to about 1000 henries. Thus, the inductance varies substantially directly with capacitance of the capacitor 10.

A low voltage battery was used to prevent undue resistance heating of the semiconductor body.

Many variations of the device are possible within the scope of the present invention. The semiconductor body, for example, can be made as an epitaxial layer on a semiconductor substrate, and the capacitor can be made as capacitors now are made in monolithic integrated circuits. High mobility semiconductors other than indium antimonide can be used. Indium arsenide can be used, for example.

The dimensions of the semiconductor plate can be varied widely. It can be made as thin as it is practically possible to go and still have a continuous film. As previously pointed out, the thinner the semiconductor plate in the magnetic field direction, the higher the values of inductance that are possible. But, on the other hand, if the semiconductor plate is made thicker, higher currents can be handled.

The number of Hall contacts on a given length of crystal can be made still larger than the number given in the example in order to improve the inductive action, and, if the contacts are located just on the edges of the semiconductor body, the entire body is more effectively used as an inductive element.

What is claimed is:

1. A solid state inductance device comprising a body of semiconducting material having a high carrier mobility, two spaced-apart current-supply terminals connected to said body and defining a current axis, said terminals also serving as means for connecting said device into a microcircuit, two spaced Hall electrodes connected to said body and defining a Hall voltage axis between said terminals at right angles to said current axis, and an impedance which is capacitive only connected across said Hall electrodes, said device being adapted for use with means providing a magnetic field having a component at right angles to said current axis and to said Hall voltage axis.

2. A device according to claim 1 including means for maintaining the device at a relatively low temperature.

3. A device according to claim 1 in which said semiconducting material is indium antimonide.

4. A device according to claim 1 in which said body and said capacitor comprise thin films adapted to be included in a micro-miniature circuit.

5. A device according to claim 1 in which said body is a thin rectangular shaped plate.

6. A solid state inductance device comprising a body of semiconducting material having a high carrier mobility, two spaced-apart current-supply terminals connected to said body and defining a current axis, said terminals also serving as means for connecting said device into a microcircuit, a plurality of pairs of spaced Hall electrodes connected to said body and defining Hall voltage axes between said terminals at right angles to said current axis, and a capacitor connected across each of said pairs of Hall electrodes, said device being adapted for use with means providing a magnetic field having a component at right angles to said current axis and to said Hall voltage axes.

References Cited

UNITED STATES PATENTS

| | | | |
|---|---|---|---|
| 2,858,275 | 10/1958 | Folberth | 252—62.3 |
| 2,862,184 | 11/1958 | Longini | 324—142 |
| 2,862,189 | 11/1958 | Kuhrt | 332—51 |
| 2,988,707 | 6/1961 | Kuhrt et al. | 331—107 |
| 3,305,790 | 2/1967 | Parsons et al. | 330—6 |

JOHN W. HUCKERT, *Primary Examiner.*

R. F. SANDLER, *Assistant Examiner.*

U.S. Cl. X.R.

317—235

Notice of Adverse Decisions in Interferences

In Interference No. 97,341 involving Patent No. 3,419,737, M. Toda, HALL EFFECT INDUCTIVE ELEMENT, final judgment adverse to the patentee was rendered Mar. 12, 1973, as to claims 1 and 5.

[*Official Gazette September 4, 1973.*]